United States Patent
Moore

(10) Patent No.: US 10,621,181 B2
(45) Date of Patent: Apr. 14, 2020

(54) SYSTEM AND METHOD FOR SCREENING SOCIAL MEDIA CONTENT

(71) Applicant: JPMorgan Chase Bank, N.A., New York, NY (US)

(72) Inventor: Devin Moore, Columbus, OH (US)

(73) Assignee: JPMORGAN CHASE BANK USA, NA, New York, NY (US)

(*) Notice: Subject to any disclaimer, the term of this patent is extended or adjusted under 35 U.S.C. 154(b) by 1082 days.

(21) Appl. No.: 14/585,352

(22) Filed: Dec. 30, 2014

(65) Prior Publication Data

US 2016/0188597 A1 Jun. 30, 2016

(51) Int. Cl.
*G06F 7/00* (2006.01)
*G06F 16/2457* (2019.01)
*H04L 12/58* (2006.01)
*G06F 16/335* (2019.01)

(52) U.S. Cl.
CPC ........ *G06F 16/24578* (2019.01); *H04L 51/12* (2013.01); *H04L 51/32* (2013.01); *G06F 16/335* (2019.01)

(58) Field of Classification Search
CPC .................................................. G06F 16/335
USPC ....................................................... 707/748
See application file for complete search history.

(56) References Cited

U.S. PATENT DOCUMENTS

| | | | |
|---|---|---|---|
| 8,065,370 B2 * | 11/2011 | Hulten | H04L 51/12 709/206 |
| 9,705,914 B2 * | 7/2017 | Di Pietro | H04L 63/1458 |
| 2005/0044154 A1 * | 2/2005 | Kaminski | H04L 51/12 709/206 |
| 2006/0168041 A1 * | 7/2006 | Mishra | H04L 29/1215 709/206 |
| 2008/0127339 A1 * | 5/2008 | Swain | H04L 51/12 726/22 |
| 2010/0174788 A1 * | 7/2010 | Vitaldevara | G06Q 10/107 709/206 |
| 2010/0241636 A1 * | 9/2010 | Findley | G06Q 10/107 707/749 |
| 2010/0251362 A1 * | 9/2010 | Gillum | G06Q 10/107 726/22 |
| 2011/0083101 A1 | 4/2011 | Sharon et al. | |
| 2011/0246583 A1 * | 10/2011 | Vitaldevara | G06Q 10/107 709/206 |

(Continued)

*Primary Examiner* — Eliyah S. Harper
(74) *Attorney, Agent, or Firm* — Greenblum & Bernstein, P.L.C.

(57) ABSTRACT

A computing system and method are provided for impact assessment and treatment of social media content, the system operating on social media content received at a social media conveyance computing system. The system includes at least one computer memory storing filtering rules and scoring rules, the score indicating a degree of negative impact of the social media content. The system additionally includes an information capture system for receiving a social media stream, the social media stream including multiple messages and a pre-processing computing system for processing the messages in the social media stream and extracting metadata related to each message. The system further includes a filtering and scoring computing system for receiving each message and associated metadata from each. The filtering and scoring computing system filters and scores the content and determines a degree of negative impact.

20 Claims, 7 Drawing Sheets

(56) References Cited

U.S. PATENT DOCUMENTS

| | | | |
|---|---|---|---|
| 2012/0089681 A1* | 4/2012 | Chowdhury | H04L 12/6418 709/206 |
| 2012/0239650 A1* | 9/2012 | Kim | G06F 17/2785 707/737 |
| 2013/0014222 A1 | 1/2013 | Bhatia et al. | |
| 2013/0054699 A1 | 2/2013 | Macaskill | |
| 2013/0103667 A1* | 4/2013 | Minh | H04L 51/32 707/709 |
| 2013/0290337 A1 | 10/2013 | Lansford et al. | |
| 2014/0280534 A1 | 9/2014 | Bell et al. | |
| 2014/0280639 A1 | 9/2014 | Bentwood et al. | |
| 2014/0365382 A1 | 12/2014 | Rubinstein et al. | |
| 2015/0095021 A1* | 4/2015 | Spivack | G06F 17/275 704/9 |

\* cited by examiner

SYSTEM AND METHOD FOR SCREENING SOCIAL MEDIA CONTENT

TECHNICAL FIELD

Embodiments of the invention are related generally to systems and methods for screening social media content and in particular for screening social media content with respect to its impact on an organization.

BACKGROUND OF THE INVENTION

In recent years, as social media has evolved, organizations have developed identities through social media channels. The participation of organizations, such as large corporations, in social media interaction has resulted in an increased flow of social media communications from customers or individuals sharing information about the organizations. Thus, social media has evolved as a channel for assessing public perception of large organizations. The public perception is important to the organizations as it impacts business success. Furthermore, organizations can improve and evolve based on an evaluation of the social media content. For example, organizations can develop and enhance features and services that are viewed positively through social media content and can develop expertise to address those services and features that are viewed negatively. Social media content may be posted in an online forum, including social networks such as Facebook™, MySpace™, and Twitter™. It should be understood that as used herein, the phrases "social network" and "social media" should be construed to encompass online interactive networks generally, including professional networks such as Linked In™ and photo sharing applications such as Instagram™.

Social media posts are often brief and frequently include unconventional abbreviations as well as slang terms. Furthermore, as with brief written messages in general, these messages are devoid of tone or inflection. Thus, the content of social media posts can be difficult to interpret. Furthermore, due to different customs and conventions across various demographic groups, social media posts may seem to be more or less hostile than they are intended to be. Thus, judging the factual value or customer engagement value of the posts can be extremely challenging.

To address difficulties with interpreting content, known filtering systems may evaluate content based simply on a list of positive or negative words. For example, the system may determine that any post using swear words reflects a negative view of the organization. In contrast, posts using words of praise or words viewed positively, such as "excellent" or "pleased" or "satisfied", may be deemed to reflect positively on the organization. Of course, this technique is inaccurate and prone to error, as positive words can be used sarcastically and negative words can be used for emphasis and vice versa. Thus, the fact that a message contains positive or negative words is not necessarily indicative of the tone of the entire message.

The evaluation of the positive or negative impact of social media content cannot be reliably accomplished without consideration of context. In fact, even with consideration of context, other factors, such as the identity of the author and demographic characteristics of the author may further alter the perceived meaning of the social media content. Known filtering systems fail to address the manner in which different people, from different cultural contexts, different localities, and different demographics, might have a differing method of communicating a similar message. Currently existing system may filter out negative words, thus often removing actual meaning.

Accordingly, a system is needed that moves beyond evaluation of the positivity or negativity of single words. Instead, a system is needed that considers context and demographic characteristics of the poster of the social media content. Additionally, it may be appropriate to consider the intended audience and the characteristics of the intended audience. For example, the size of the audience, the location of the audience, and the demographic characteristics of the intended audience are factors that may assist with interpretation of social media content.

Furthermore, output from an evaluation system should preferably assess a degree of positivity of negativity of social media content, so that concerns can be appropriately addressed within the evaluating organization.

SUMMARY OF THE INVENTION

In one aspect of the invention, a computer-implemented system is provided for impact assessment and treatment of social media content for organizations. The system operates on social media content received at a social media conveyance computing system. The system includes at least one computer memory storing filtering rules for filtering social media content based on multiple different criteria and scoring rules for assigning a score to the filtered social media content. The score is configured to indicate a degree of negative impact or conversely the degree of positive impact of the social media content. An information capture system receives a social media stream including multiple social media messages. A pre-processing computing system processes the messages in the social media stream and extracts metadata related to each message. A filtering and scoring computing system is provided for receiving each message and associated metadata from each message. Upon receiving the messages and metadata, the filtering and scoring computing system performing multiple steps. The filtering and scoring system accesses the filtering rules using a filtering engine, wherein the filtering engine filters each message based on multiple factors including at least demographic factors and locality factors. Based on the filtered content, the scoring engine scores each message based on the multiple factors and weighs each score corresponding to the factors. The scoring engine then uses an algorithm to determine a total score based on a combination of the weighted scores and compares each total score to a pre-determined threshold to determine if the score exceeds the pre-determined threshold thereby creating a negative impact.

In an additional aspect of the invention, a corresponding computer-implemented method is provided for impact assessment and treatment of social media content for organizations. The method utilizes a filtering and scoring computing system for operating on the social media content received at a social media conveyance computing system. The method includes storing, in at least one computer memory, filtering rules for filtering the social media content based on multiple different criteria and scoring rules for assigning a score to the filtered social media content. The resultant score indicates a degree of negative impact of the social media content or alternatively a degree of positive impact. The method further includes receiving a social media stream through an information capture system. The social media stream includes multiple social media messages. The method further includes processing the messages in the social media stream using at least one computer processor and extracting metadata related to each message. The system sends each message and associated metadata from each message to a filtering and scoring computing system, where the method is further carried out by accessing the filtering rules using at least one computer processor operating as filtering engine. The filtering engine filters each message based on multiple factors including at least demographic factors and locality factors and performs scoring of each message using a scoring engine to score the message based on the multiple factors. The scoring engine further performs the steps of weighting each score and using an algorithm to determine a total score based on a combination of the weighted scores and comparing each total score to a pre-determined threshold. The system performs the additional step of determining if the score exceeds the pre-determined threshold thereby creating a negative impact.

BRIEF DESCRIPTION OF THE DRAWINGS AND EXHIBITS

The purpose and advantages of the present invention will be apparent to those of skill in the art from the description in conjunction with the appended exhibits:

DESCRIPTION OF THE INVENTION

Embodiments of the invention are related generally to systems and methods for implementing a context aware social filtering and scoring apparatus to assess the impact of social media content on an organization and further to mitigate the impact when necessary. The system utilizes multiple rules filters and associated scoring engine to produce an output-weighted response indicator. This response indicator ranks the response severity, positive/negativity, and other factors scaled to a neutral filter analysis. The indicator can be used to mitigate negative impact and further to determine which social media content can be used for promotional purposes. Individual scores combined to present the total score can be based on characteristics identified by filters including a locality filter, context filter, demographic and cultural filters, and a meme filter. The factors considered in assessing the total score may include features such as positivity of the message, severity, short/long term discussion length, scope of discussion, spread of message and geographic distribution of similar sentiment. The scored combination of these features may be utilized to determine positive or negative impact.

Figure 1:
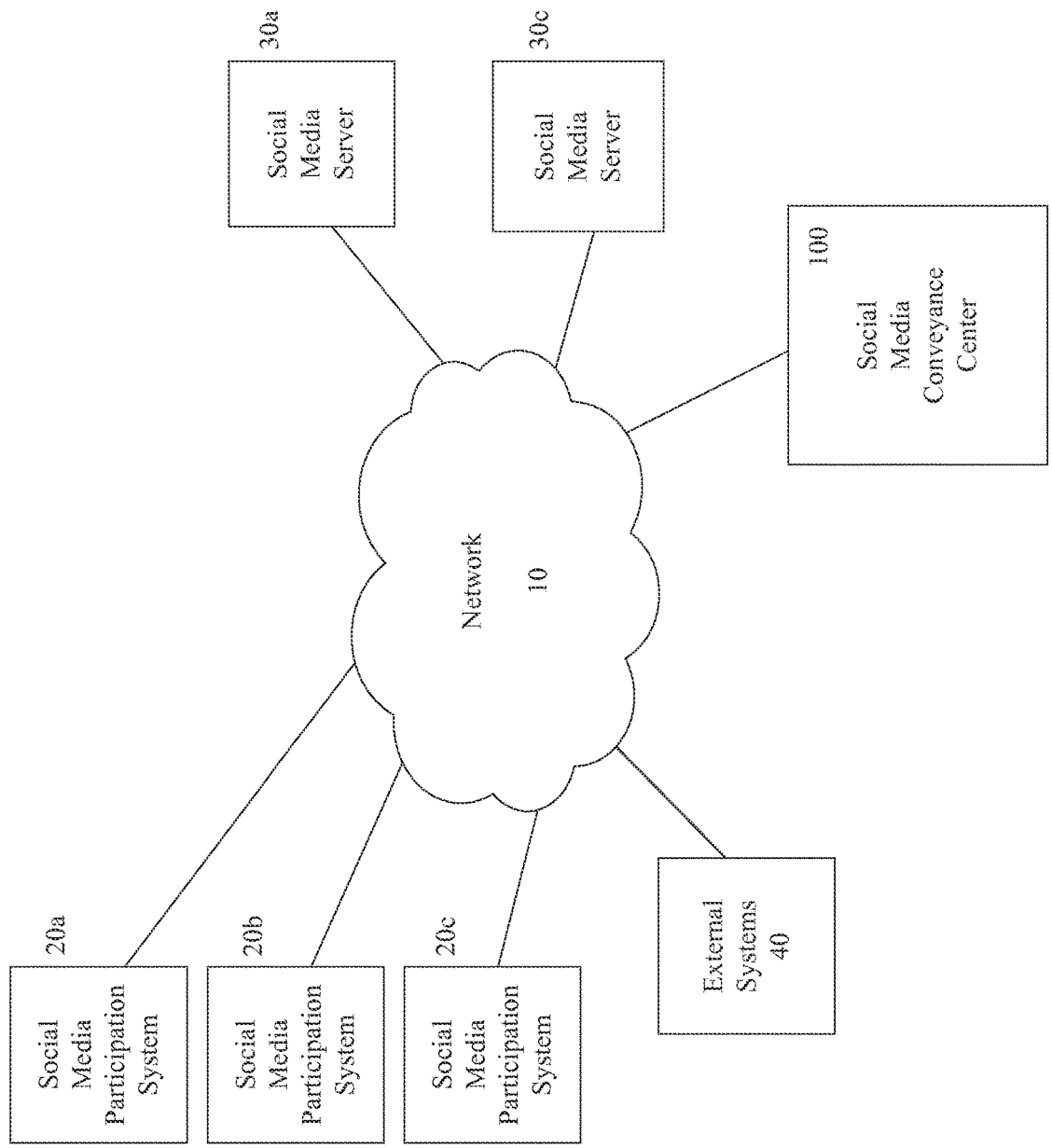
FIG. 1 is a block diagram illustrating an environment for a social media conveyance computing system in accordance with an embodiment of the invention.

FIG. 1 is a block diagram illustrating an environment for a social media conveyance computing system 100 in accordance with an embodiment of the invention. Multiple social media participants systems 20a, 20b, and 20c may be connected over a network 10 with multiple social media servers 30a . . . 30c. An organization may utilize the social media conveyance center 100, also connected over the network 10 with the social media servers 30a . . . 30c. The social media conveyance center 100 may include components to receive and interpret social media content on behalf of the concerned organization.

The social media participation systems 20a . . . 20c may be computing devices used by individuals or organizations to post and access social media content. The social network users of the systems 20a . . . 20c may typically be individuals connecting over the network 10 through the use of computing devices such as desktop, laptop, or portable computing devices such as iPhones, iPads, or Android smart phones. In embodiments of the invention, the social network users may be required to be members of the social networking systems hosted by the social media servers 30a . . . 30c. For example, the social network users may be members of Twitter™. Although social media content through Twitter™ (tweets) are publicly visible by default, senders can restrict message delivery to just their followers. Users can tweet via the Twitter™ website, compatible external applications, or by Short Message Service (SMS). Retweeting occurs when a tweet is forwarded via Twitter™ by users. Both tweets and retweets can be tracked to see which ones are most popular. Twitter™ allows users to update their profile via their mobile phone either by text messaging or by apps released for certain smartphones and tablets.

The social media servers 30a . . . 30c may be or include servers utilized to host known social networking systems such as for example, Facebook™, Myspace™, or Twitter™. While a preferred embodiment of the invention leverages Twitter™ servers, additional or alternative servers for other social networking systems may be utilized. The networking servers may alternatively support a professional networking system such as, for example, LinkedIn™ or a photo sharing application such as Instagram™. The Twitter™ servers enable users to send and read short 140-character messages called "tweets". Registered users can read and post tweets, but unregistered users can only read them. The participant systems 20a . . . 20c access the Twitter™ servers 30a . . . 30c through the website interface, SMS, or mobile device application. Using a social networking systems, users can join and create groups according to their interests or areas of expertise. Users can choose fan pages according to their interests to connect and interact with other strangers. Users can also join networks organized by city, workplace, school, and region to connect and interact. With a professional networking site, such as LinkedIn™, registered users are able to maintain a list of contact details of people they know and trust in business. Users can invite anyone to become a connection. This list of connections can then be used, for example, to build up a contact network, to find jobs or business opportunities, or to hire people seeking jobs. Another social networking system that may be implemented is Twitter, which enables its users to send and read text-based messages that are displayed on the author's profile page and delivered to the author's subscribers who are known as followers. With Twitter, senders can restrict delivery to those in their circle of friends or, by default, allow open access. Although Facebook™, MySpace™, Twitter™, and LinkedIn™ are mentioned herein, similar networking systems may also or alternatively be implemented.

The social media conveyance center 100 may be operated by an organization concerned about its social media reputation. In embodiments of the invention, the social media conveyance center 100 receives a social media stream from the social media servers 30a . . . 30c and broadcasts the social media content. The broadcast may be made to employees or followers of the organization on their own computing devices or may be made on a large centralized display screen having high visibility within the organization. The broadcast may alternatively be made via an organizational website available over the Internet or through an Intranet internal to the organization. As will be further described herein, the social media conveyance center 100 is equipped with a filtering and scoring system that evaluates social media content. The evaluation can be made to determine which content should be broadcast and further, to determine if any particularly negative content requires additional corrective action. For example, social media content that indicates customer dissatisfaction with the organization may be routed to customer service systems or other management systems capable of implementing remedial action.

External systems and sources 40 may include various systems and sources connectable over the network 10 to the above-described systems. Since the organizational social media conveyance center 100 collects information to aid the filters in interpreting social media posts, such information is available from the external systems and sources 40. Accordingly, the external systems and sources 40 may include, for example, news and other media sources, database sources, including information sources such as Lexis or Westlaw, social media sources, and governmental records sources posted by or on behalf of federal, state, or local governments. These are merely examples, as the scope of the external systems and sources 40 is generally unlimited.

The network 10 is preferably the Internet, but may be or include other types of networks. The network 10 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Figure 2:
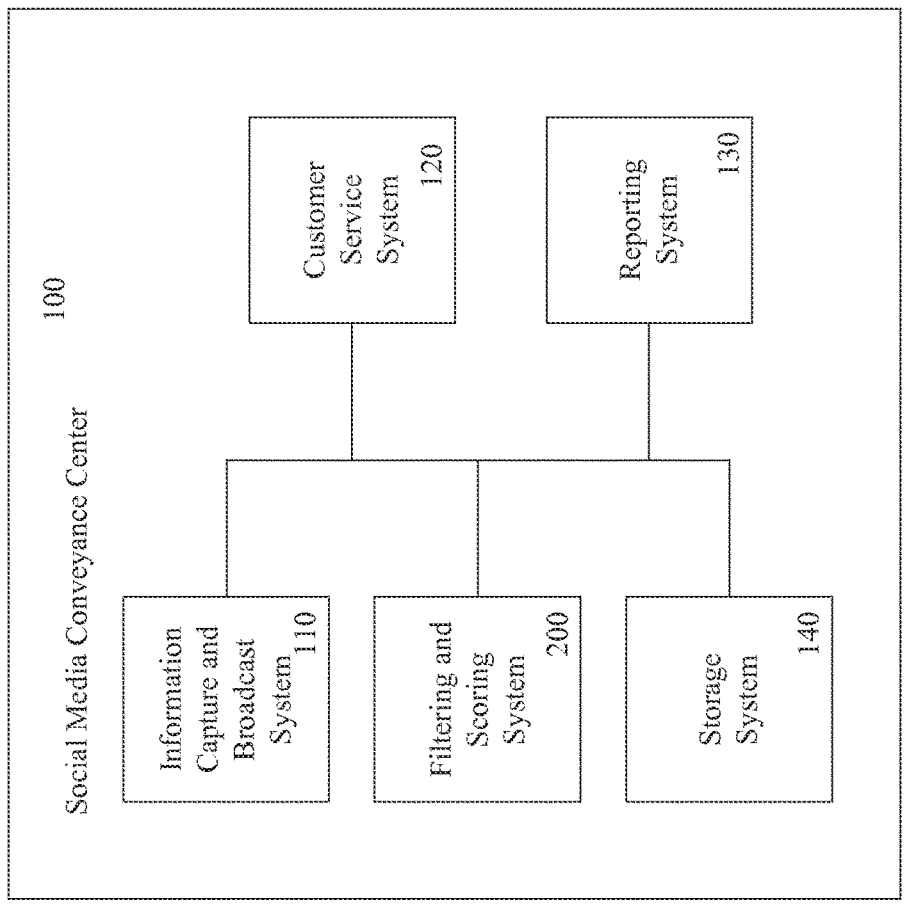
FIG. 2 is a block diagram illustrating a social media conveyance computing system in accordance with an embodiment of the invention.

FIG. 2 is a block diagram illustrating a social media conveyance computing system 100 in accordance with an embodiment of the invention. The social media conveyance center 100 may include an information capture and broadcast system 110, a filtering and scoring system 200, a storage system 140, a customer service system 120, and a reporting system 130.

The information capture and broadcast system 110 is configured to capture social media content delivered form the social media servers 30a . . . 30c. As explained above, in embodiments of the invention, the social media servers 30a . . . 30c include Twitter™ servers. In order to capture the social media stream from Twitter™, the information capture and broadcast system 110 may utilize one of multiple methods. Three known methods of accessing Twitter™ include a search API, a streaming API, and the Twitter Firehose™. The search API allows users to search through existing tweets based on keywords, usernames, and places. However, Twitter™ places limits on the number of results that will be generated. The streaming API will provide tweets corresponding to a search query in near real-time. However, when a large number of results is produced, Twitter™ returns only a small percentage of the tweets. The Twitter Firehose™ also provides tweets in near real-time. However, unlike the streaming API, the Twitter Firehose™ has no limitations on the number of results that can be produced, but typically comes at greater costs than the APIs. If an organization has access to the Twitter Firehose™, this is an optimal access method for utilization with the system of the invention as it enables the filtering system to provide unlimited real-time feedback. However, if the Twitter Firehose™ is cost prohibitive or unavailable for other reasons, the APIs or other Twitter™ access methods may also be implemented.

The information and broadcast system 110, may search the stream it receives for information pertinent to the organization. The system 110 may accomplish this by searching for the name of the organization in the content of the tweet. Alternatively, a hashtag may specifically reference the organization. Hashtags are words or phrases prefixed with a "#" sign that can be used to group posts. Similarly, the "@" sign followed by a username is used for mentioning or replying to other users. All of this content can be searched for relevance to the organization.

The filtering and scoring system 200 will be further described with reference to FIGS. 3-5 below. The filtering and scoring system 200 operates on the social media content identified by the information capture system 110 to interpret the content and assign a score to the content. The filtering and scoring system 200 also interprets the score and in order to determine the ultimate disposition or corrective action required for the social media content under consideration.

The storage system 140 stores data, information, algorithms, rules, and any other information useful to the functioning of the filtering and scoring system 200. The storage system 140 may also store input social media content and actions associated with the social media content, so as to maintain a record of actions taken with respect to received content.

The customer service system 120 may be response to output from the filtering and scoring system 200 to resolve issues and mitigate damage and negative impact resultant from negative social media content. The customer service system 120 may also receive reports from the reporting system 130 dictating action for multiple social media messages.

The reporting system 130 may generate reports for output to the customer service system 120, but also may generate reports to show trends and results to analysts and corporate image management personnel. Reports may include statistics regarding volume, trends, average scores, the percentage of positive communications vs. negative communications, and other collectable data items.

Figure 3:
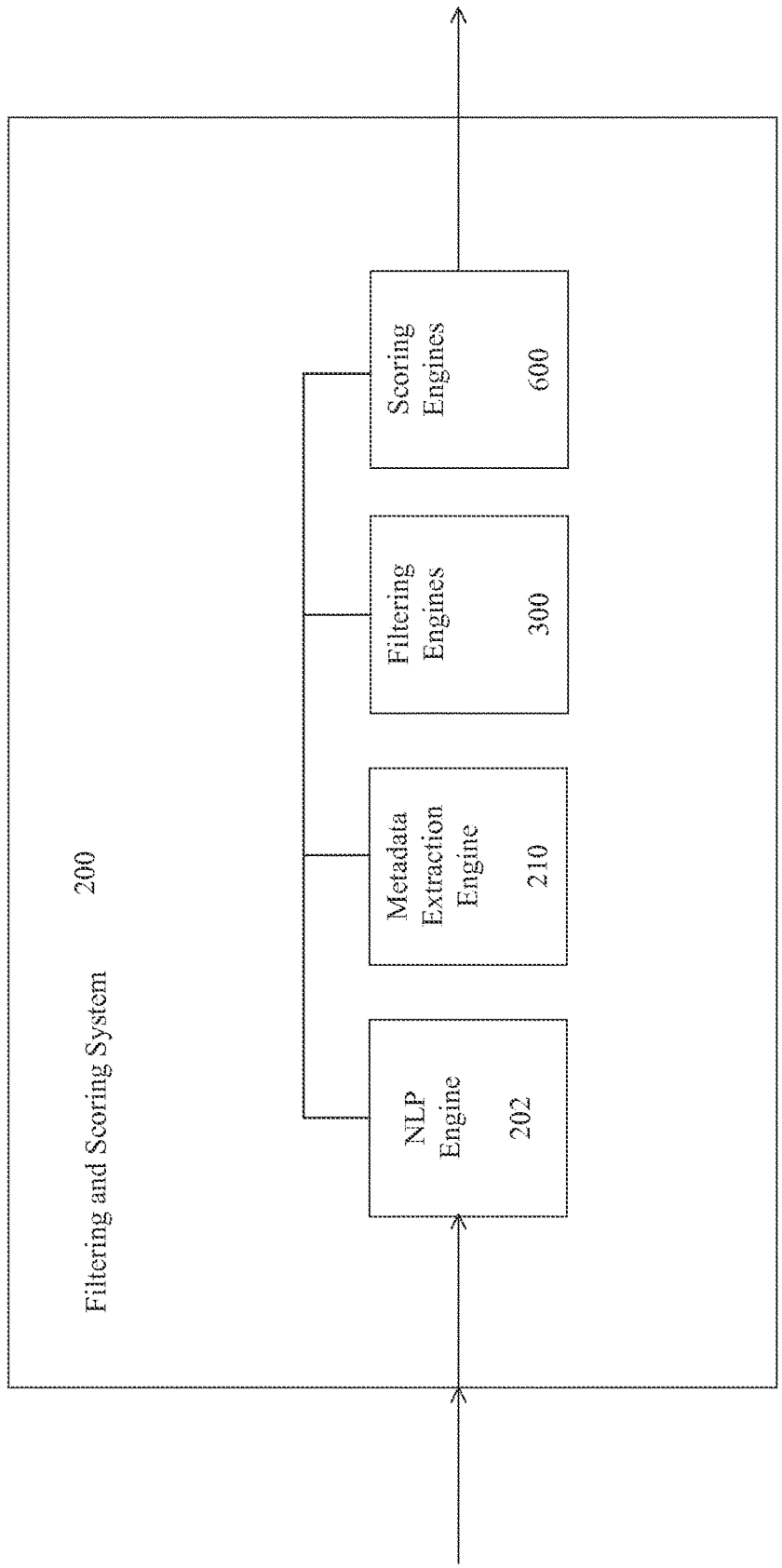
FIG. 3 is a block diagram illustrating a filtering and scoring system for use in combination with the social media conveyance computing system in accordance with an embodiment of the invention.

FIG. 3 is a block diagram illustrating details of the filtering and scoring system 200 for use in combination with the social media conveyance computing system 100 in accordance with an embodiment of the invention. The filtering and scoring system 200 may include a natural language processing (NLP) engine 202, a metadata extraction engine 210, filtering engines 300, and scoring engines 600.

The NLP engine 202 may operate to pre-process and interpret social media content where required. For example, the NLP engine 202 may automatically translate text from one human language to another. This task requires knowledge of grammar, semantics, and facts in order to solve properly. The NLP engine 202 may also perform named entity recognition. Given a stream of text, the NLP engine 202 may determine which items in the text map to proper names, such as people or places, and what the type of each such name is (e.g. person, location, organization). Another task that be accomplished by the NLP engine 202 is natural language understanding, which involves converting chunks of text into more formal representations such as first-order logic structures that are easier for computer programs to manipulate. Natural language understanding involves the identification of the intended semantic from the multiple possible semantics which can be derived from a natural language expression which usually takes the form of organized notations of natural languages concepts. Another possible function of the NLP engine 202 is part-of-speech tagging. Given a sentence, the NLP engine 202 may determine the part of speech for each word. Many words, especially common ones, can serve as multiple parts of speech. For example, "plan" can be a noun ("the plan under consideration") or verb ("to plan a trip"); "set" can be a noun, verb or adjective; and "out" can be any of at least five different parts of speech. The NLP engine 202 can perform additional functions such as parsing and sentence breaking. The NLP engine 202 may additionally perform sentiment analysis by extracting subjective information to determine polarity. Additional NLP tasks include topic segmentation for identifying the topic of a segment and word sense disambiguation for ascertaining the meaning of words in context that have more than one meaning.

As illustrated, the NLP engine may be a separate component as shown at 202. Alternatively, one or more NLP functions may be performed within each filtering engine as will be further described below.

The metadata extraction engine 210 may extract data relevant to the poster and/or content of a social media post. Descriptive metadata may accompany the social media content or may be discoverable through social media account information, internet search engine, IP address, or other method. By obtaining metadata describing the contents and context of data files, the usefulness of the original data/files is greatly increased. Descriptive metadata may be internally stored or written into photo or text files or may be externally stored and available through external sources. The metadata might include for example, the identity of the poster, the location of the poster, the age of the poster, and the destination of the message. Once located, the metadata can be stored and managed in a database, often called a metadata registry or metadata repository.

Thus, the metadata extraction engine 210 may include one or more search engines, adapted to search databases or perform internet searches to locate information about the poster. The metadata extraction engine 210 may thus include search tools for locating relevant metadata about the poster such as location, gender, age, ethnicity, language, home ownership status, income, and other facts. The metadata extraction engine may also locate information about the target audience if desired. For example, account data may be available to ascertain the location, age, or gender of the poster. The location may be derived from an IP address, stored account information, search engine information or other source. The metadata extraction engine 210 may mine data from social media accounts to collect information about the poster. Additionally, the metadata extraction engine may review a post history for each poster and may use geo-location functionality.

The filtering engines 300 operate on the social media content and metadata to determine various facts about the poster and the content of the message. The filtering engines will be further described below with respect to FIGS. 4 and 5.

The scoring engines 600 operate on the filtered content to produce output weighted response indicators, which then may be combined to produce a score for a social media message. The scoring engine evaluates the score for its relationship to a pre-set threshold in order to determine if the content should be forwarded, re-posted, referred to customer service or if any other action should be taken. The scoring engines 600 will be further described below with relation to FIG. 6.

Figure 4:
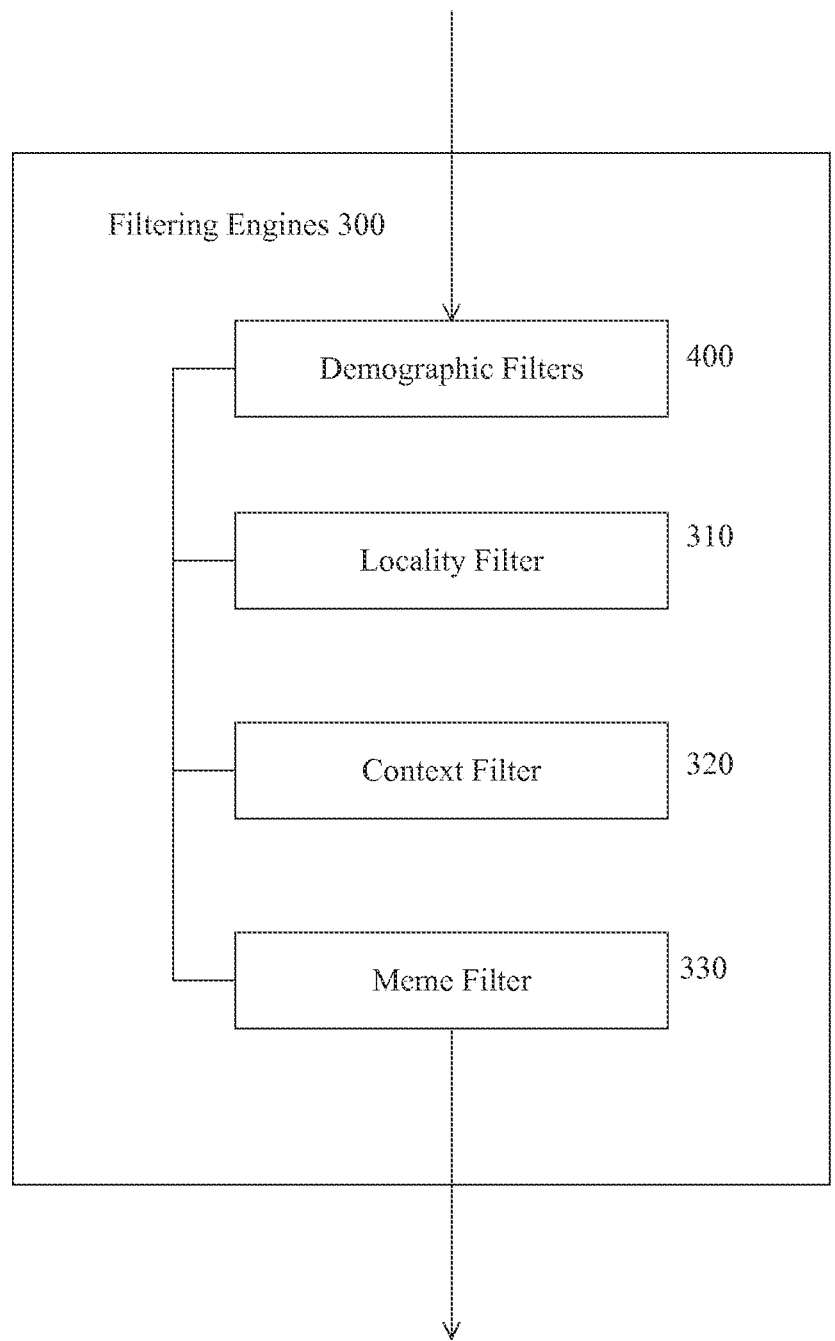
FIG. 4 is a block diagram illustrating filtering engines for use in the filtering and scoring system in accordance with an embodiment of the invention.

FIG. 4 is a block diagram illustrating the filtering engines 300 for use in the filtering and scoring system in accordance with an embodiment of the invention. The filtering engines 300 may include demographic filters 400, a locality filter 310, a context filter 320, and a meme filter 330. Other filters may also be included.

The locality filter 310 may utilize locality metadata to determine if the poster locality is associated with any particular speech patterns or characteristics. For example, individuals from certain localities may be more likely to use swear words than individuals from other localities. Thus, if the locality filter determines that the poster is from Detroit and is therefore more likely than the average individual to use a swear word, the scoring engine takes this into consideration and weights the use of the swear words much less than if a poster from Rhode Island had used the same combination of words.

The context filter 320 may evaluate the context of the social media post. For example, the context filter 320 may determine if the poster talking about a trending topic and whether there are specific relevant facts surrounding the post. In some instances, discussion of a trending topic may sound more negative or positive that it actually is. Specific words may be repeatedly used during discussion of various topics.

The meme filter 330 may filter on an idea, behavior, or style that spreads from person to person within a culture. A meme acts as a unit for carrying cultural ideas, symbols, or practices that can be transmitted from one mind to another through writing, speech, gestures, rituals, or other imitable phenomena with a mimicked theme. Memes spread through the behavior that they generate in their hosts. Memes that propagate less prolifically may become extinct, while others may survive, spread, and mutate. Memes that replicate most effectively enjoy more success, and some may replicate effectively even when they prove to be detrimental to the welfare of their hosts.

Figure 5:
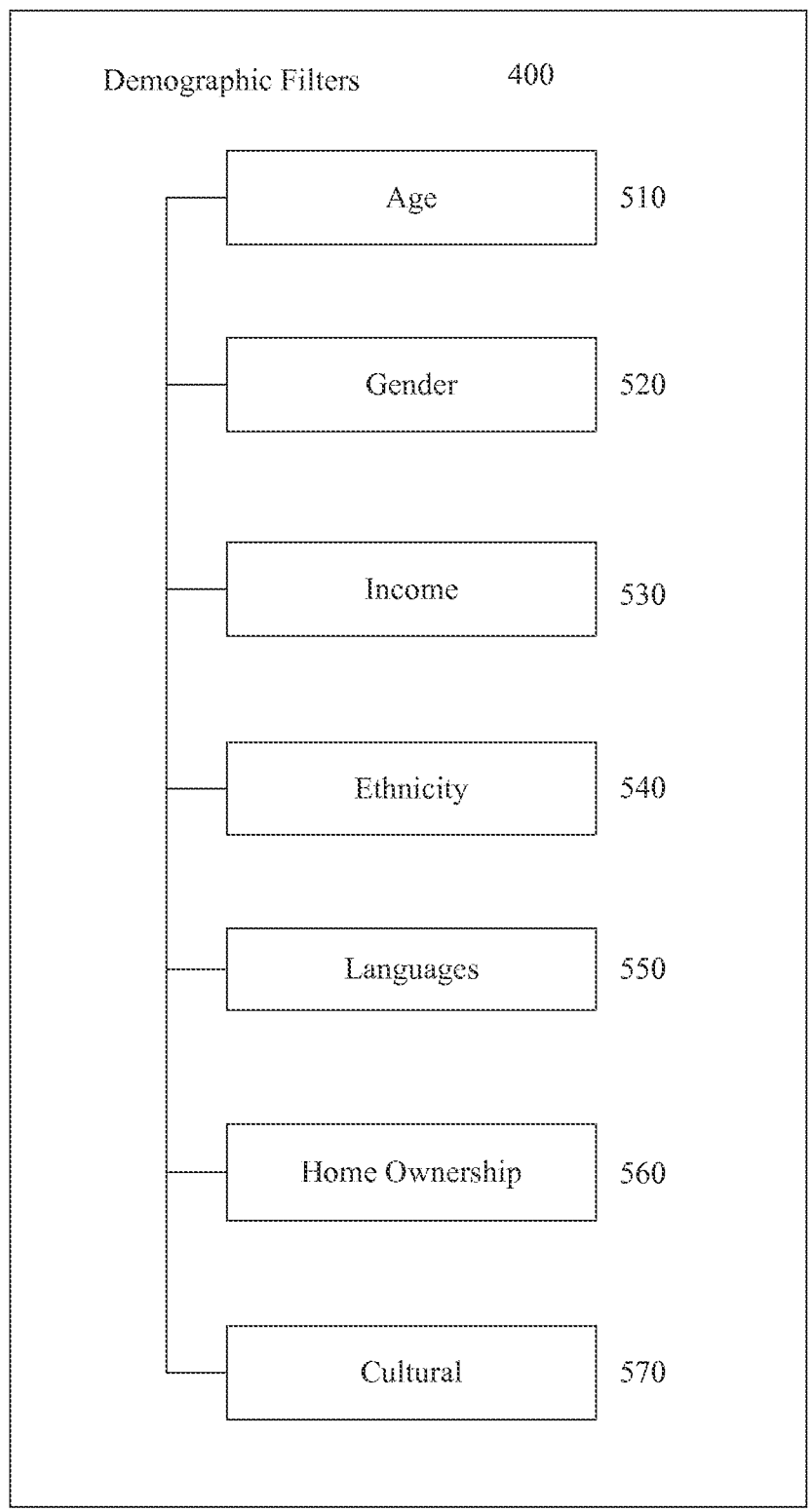
FIG. 5 is a block diagram illustrating demographic filters for use in the filtering and scoring system in accordance with an embodiment of the invention.

FIG. 5 is a block diagram illustrating the demographic filters 400 for use in the filtering and scoring system in accordance with an embodiment of the invention. The demographic filters 400 may, for example include an age filter 510, a gender filter 520, an income filter 530, an ethnicity filter 540, a languages filter 550, a home ownership filter 560, and a cultural filter 570.

Demographics can be described as the quantifiable statistics of a given population. Demographics are also used to identify the study of quantifiable subsets within a given population which characterize that population at a specific point in time. Commonly examined demographics include gender, age, ethnicity, knowledge of languages, disabilities, mobility, home ownership, and employment status. Demographics can be viewed as the essential information about the population of a region and the culture of the people there.

The age filter 510 may determine the age of the poster. This information can be extracted, for example through social media account information or via internet search engine. The age filter 510 may also be utilized to assess an average age of the target population for a social media post. People of different ages tend to favor different expressions. Thus, a phrase that might be perceived as negative from a 55 year old individual may occur so commonly among the 25 year old population that it is not perceived as negative.

The gender filter 520 may determine the gender of the social media poster. Gender may be determined through name, social media account information, internet search engine, self-reporting, or other mechanism. As men and women may favor different expressions and phraseology, a negative or positive phrase from a male may not be perceived as significant as if a female had used the same phrase.

The income filter 530 may have access to information that attributes characteristics based on income range. Individuals with an income between fifteen and twenty five thousand per year may have markedly different speech patterns than individuals making between eighty and one hundred thousand per year. Income characteristics may be self-reported or may be determined through search engine, account information, or other sources.

The ethnicity filter 540 may be operable to determine an ethnic background of the poster. Ethnic characteristics may be self-reported, may be associated with a poster name, or may be located through a search engine. Individuals with different ethnic backgrounds may utilize different speech patterns and accordingly posts may be scored differently based on ethnic background.

The languages filter 550 may determine whether a poster speaks one or more languages. Languages spoken may be self-reported, may be contained in a poster profile in a database, or may be determined by search engine. Bilingual individuals who speak both English and Spanish fluently may generally utilize a different vocabulary from that used by individuals who speak only English. Thus, this discrepancy can be noted by the filtering engine and taken into consideration by the scoring engine when determining a score for a social media post.

The home ownership filter may determine the home ownership status of the poster. It may be determined that home owners are inclined to use different language to discuss certain topics, such as those involving mortgage loans and finances. Accordingly, within certain contexts, language used by homeowners may be scored differently from language posted by renters.

The cultural filter 570 may determine whether a poster is from one of a plurality of pre-defined cultures. Culture can be defined based on a combination of factors such as location, ethnicity, and languages spoken. Individuals may have different vocabularies based on their cultural backgrounds. Thus, the filtering engine may filter based on culture and the scoring engine may score language from a social media post differently based on the determined culture.

Figure 6:
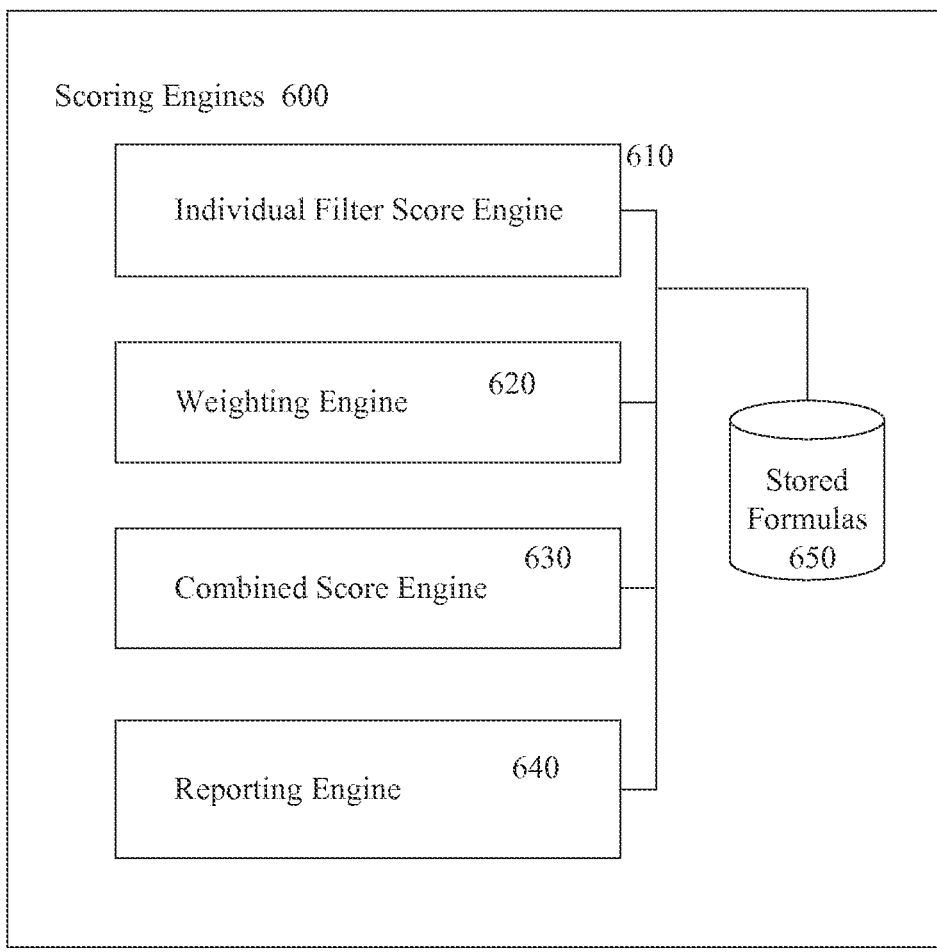
FIG. 6 is a block diagram illustrating scoring engines for use in the filtering and scoring system in accordance with an embodiment of the invention.

FIG. 6 is a block diagram illustrating scoring engines 600 for use in the filtering and scoring system in accordance with an embodiment of the invention. The scoring engines 600 may include general filter scoring engines 610, a weighting engine 620, a combined score engine 630, and reporting engine 640. All of the engines may access stored formulas 650.

The general scoring engines 610 may create a general score for each social media statement under evaluation. The weighting engine 620 may weigh each score based on the filtered characteristics. For example, a post may have received a score of 30, where zero is the most negative score and one hundred is the most positive score. However, since the post came from an individual from California, score should be divided by a weighting factor of 0.7, and thus becomes more positive than if the score had come from a person from a different locale. It may also be determined that the individual is in the age range of 25-35, causing the score to be divided by a weighting factor of 0.9. A combined scoring engine can combine all of the weighted scores and average them or combine them using an appropriate algorithm in order to reach a final score.

Furthermore, scoring may be performed for multiple factors pertaining directly to the message itself prior to weighting. As set forth above, the factors may include positivity of the message, but may also include severity of the message, length of the message, length of the discussion related to the message, scope of the discussion, whether the topic of the message is trending, and spread or geographic distribution of the message. Other factors may also be considered to assess the overall positive or negative impact of the social media content.

The reporting engine 640 may report the final score and determine if the final score requires that the social media post be forwarded to a customer service computing system or another organizational system for remedial action. For example, it may be determined that if a total score is below twenty, that the social media post should be further addressed. Alternatively, the reporting engine 640 may be determined that if the social media content has a score exceeding 80, that it should be re-posted, re-tweeted or similarly treated for maximal exposure and reputation management.

Stored formulas 650 may be accessible to the scoring engines to determine a total score. The score may be determined in any number of ways based on the content, metadata, and filtering results. Furthermore, the filters described above are merely exemplary and should not be construed as limiting.

The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Figure 7:
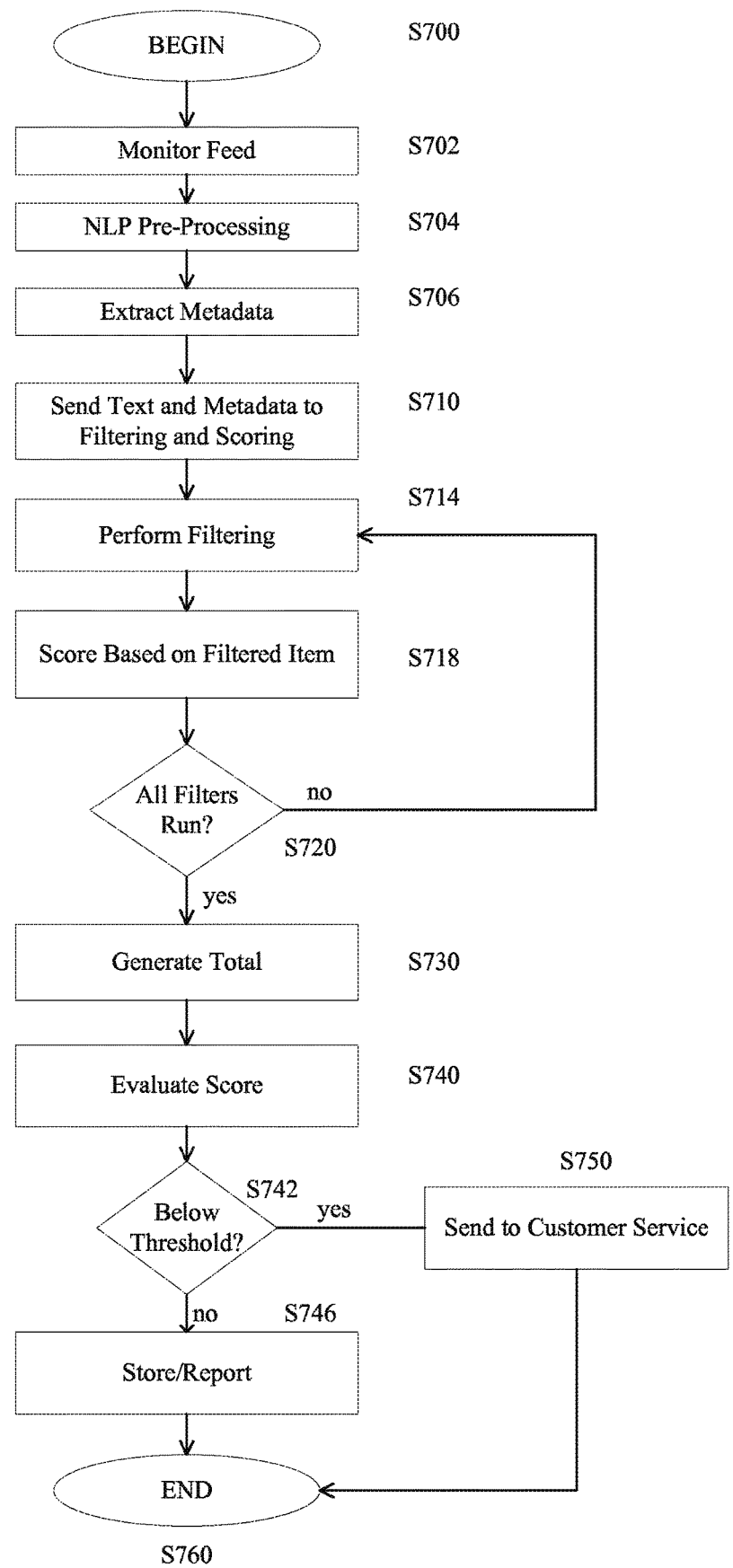
FIG. 7 is a flow chart illustrating a method of conducting an impact assessment for an organization in accordance with an embodiment of the invention.

FIG. 7 is a flow chart illustrating a method of conducting an impact assessment for an organization in accordance with an embodiment of the invention. The process begins in S700 and the system monitors the social media feed in S702. The social media feed may be received, for example, through Twitter Firehose™ or an alternative API as set forth above. In S704, the system may optionally conduct NLP pre-processing to interpret the broadcast text. In an alternative embodiment of the invention, this interpretation functionality may be wholly incorporated in the filtering functions. In S706, the system extracts metadata from the social media posts or associated social media accounts. The metadata may include, for example, data pertaining to the origin, destination, sender, or recipient of the message. In S710, the system sends the both the textual content and the metadata to the filtering and scoring system.

In S714, the system performs filtering. The filtering may encompass filtering on all of the factors as set forth above with respect to FIGS. 4 and 5. Additionally, the filtering system may incorporate language processing components to parse and interpret the broadcast text in the event that pre-processing components are not provided.

In S718, the system performs scoring on the filtered text. The scoring may be performed as shown based on the output produced from each filter. Thus, the system may cycle through each filter as indicated as S720 and perform scoring based on the output of each filter.

In S730, the system may generate a total score. The total score may be generated, for example, by weighting the output score from each filter and combining the weighted scores based on a predetermined algorithm to generate a total score. The weightings may be predetermined based on a number of factors and may be adjusted over time. Alternatively, the weighting may or may be generated periodically based on a particular social media topic or other factor. In an alternative embodiment, one output weighted response indicator may be produced for a combination of all applicable filters. The indicator is then used to evaluate each social media post with respect to factors such as positivity, severity, scope, spread, length, etc. A total score may then be generated based on all of these factors to provide a single score for positive or negative impact.

Once the total is generated in S730, the system evaluates the score in S740. Evaluation of the score involves comparison of the score with a predetermined threshold. The threshold may be pre-set in order to ensure that the organization addresses problems that cause negative scores. Furthermore, social media content with very positive scores may also be appropriately evaluated and treated.

If the score is below a predetermined threshold in S742, the system may send the social media content to customer service or another appropriate system for treatment in S750. If the score is within a standard range in S742, the score may be stored and/or reported in S746. The process ends in S760.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method for impact assessment and treatment of social media content, the method utilizing a filtering and scoring computing system for operating on the social media content received at a social media conveyance computing system, the method comprising:

storing, in at least one computer memory, filtering rules for filtering the social media content and scoring rules for scoring the filtered social media content;

receiving a social media stream through an information capture system, the social media stream including multiple messages;

processing the multiple messages using at least one computer processor and extracting metadata related to each message;

sending each message and the extracted metadata related to each message to the filtering and scoring computing system;

accessing the filtering rules using at least one computer processor operating as filtering engine and applying the filtering rules to each message to filter each message based on multiple factors including at least demographic factors and locality factors;

identifying one or more localities in the extracted metadata, and generating a weighted score associated with each locality;

processing data within each message to recognize one or more speech patterns or characteristics;

analyzing the data in each message to recognize speech patterns or characteristics associated with a particular locality and scoring each message using a scoring engine implementing the computer processor to generate a first score for each message based on recognized speech patterns or characteristics associated with the particular locality;

calculating a total score for each message using an algorithm, wherein the total score is based on the first score and the weighted score for the particular locality;

establishing an impact threshold for determining a relationship status for each message, and comparing the total score for each message to the impact threshold to identify messages indicative of a negative relationship status;

forwarding messages having the negative relationship status for corrective action; and broadcasting messages not having the negative relationship status.

2. The method of claim 1, wherein the information capture system receives a Twitter feed through a Twitter Firehose application.

3. The method of claim 2, wherein the metadata includes data obtained from Twitter account registration from a sender of the message.

4. The method of claim 1, wherein the filtering and scoring computing system includes a demographic filtering engine, wherein the demographic filtering engine filters based on demographic factors including at least two of age, gender, income, and ethnicity.

5. The method of claim 1, wherein the filtering and scoring system includes a locality filtering engine for filtering the messages based on sender locality.

6. The method of claim 1, wherein the filtering and scoring system includes a context filter for filtering messages based on context.

7. The method of claim 1 further comprising:

generating an updated score for each message having a negative relationship status, wherein the updated score is based on the total score and indicative of a degree of negativity; and reporting the updated score with each message forwarded for corrective action.

8. The method of claim 1, wherein the corrective action comprises a customer service system.

9. The method of claim 1, further comprising using natural language processing components to filter the multiple messages based on context.

10. The method of claim 1, further comprising using natural language processing components to perform word sense disambiguation of the data in the multiple messages.

11. A computing system for impact assessment and treatment of social media content, the system operating on social media content received at a social media conveyance computing system, the system comprising:

at least one computer memory storing filtering rules for filtering social media content and scoring rules for scoring the filtered social media content;

an information capture system for receiving a social media stream including multiple messages;

a pre-processing computing system for processing the multiple messages and extracting metadata related to each message;

a filtering and scoring computing system including at least one computer processor coupled to the computer memory for receiving each message and the extracted metadata related to each message and for performing steps including:

accessing the filtering rules using a filtering engine to filter each message based on multiple factors including at least demographic factors and locality factors;

identifying one or more localities in the extracted metadata and generating a weighted score associated with each identified locality;

processing data within each message to recognize one or more speech patterns or characteristics;

analyzing the data in each message to recognize speech patterns or characteristics associated with a particular locality and scoring each message using a scoring engine implementing the computer processor to generate a first score for each message based on the recognized speech patterns or characteristics associated with the particular locality;

calculating a total score for each message using an algorithm, wherein the total score is based on the first score and the weighted score for the particular locality;

establishing an impact threshold for determining a relationship status for each message, and comparing the total score for each message to the impact threshold to identify messages indicative of a negative relationship status;

forwarding messages having the negative relationship status for corrective action; and broadcasting messages not having the negative relationship status.

12. The system of claim 11, wherein the information capture system receives a Twitter feed through a Twitter Firehose application.

13. The system of claim 12, wherein the metadata includes data obtained from Twitter account registration from a sender of the message.

14. The system of claim 11, wherein the filtering and scoring computing system includes a demographic filtering engine, wherein the demographic filtering engine filters based on demographic factors including at least two of age, gender, income, and ethnicity.

15. The system of claim 11, wherein the filtering and scoring system includes a locality filtering engine for filtering the messages based on sender locality.

16. The system of claim 11, wherein the filtering and scoring system includes a context filter for filtering messages based on context.

17. The system of claim 11, wherein the filtering and scoring system further performs steps including:
  generating an updated score for each message having a negative relationship status, wherein the updated score is based on the total score and indicative of a degree of negativity; and
  reporting the updated score using a reporting engine with each message forwarded for corrective action.

18. The system of claim 11, wherein the corrective action comprises a customer service system.

19. The system of claim 11, further comprising using natural language processing components to filter the multiple messages based on context.

20. The system of claim 11, further comprising using natural language processing components to perform word sense disambiguation of the data in the multiple messages.

* * * * *